United States Patent [19]

Renner

[11] B  4,014,955
[45] Mar. 29, 1977

[54] PROCESS FOR THE MANUFACTURE OF POLYETHERS CONTAINING IONIC BONDS

[75] Inventor: Alfred Renner, Munchenstein, Switzerland

[73] Assignee: Ciba-Geigy AG, Basel, Switzerland

[22] Filed: Feb. 7, 1974

[21] Appl. No.: 440,632

[44] Published under the second Trial Voluntary Protest Program on April 13, 1976 as document No. B 440,632.

[30] Foreign Application Priority Data

Feb. 14, 1973 Switzerland .................. 2087/73

[52] U.S. Cl. ........................ 260/831; 252/357; 260/2.1 C; 260/14; 260/17.2; 260/DIG. 17
[51] Int. Cl.$^2$ .......................... C08G 45/08
[58] Field of Search ....... 260/47 EN, 47 EP, 2.1 R, 260/2.1 C, 51.5, 2 BP, 826, 831, 836, 33.8 EP, DIG. 17

[56] References Cited

UNITED STATES PATENTS 3,436,373 4/1969 Cox et al. ................... 260/47 X
3,462,382 8/1969 Kolka et al. ................ 260/51.5
3,625,684 12/1971 Poot et al. .................. 260/2 A
3,790,606 2/1974 Sellet .......................... 260/401

FOREIGN PATENTS OR APPLICATIONS 652,830 5/1951 United Kingdom

*Primary Examiner*—Donald E. Czaja
*Assistant Examiner*—T. Pertilla
*Attorney, Agent, or Firm*—Wenderoth, Lind & Ponack

[57] ABSTRACT

The cross-linked macromolecular polyethers containing ionic bonds are obtained by reacting polyhydric phenols which contain amino groups (Mannich bases) on the one hand with compounds which contain on average more than one epoxide group per molecule, and on the other hand with organic compounds which contain at least 2 halogen atoms. The reaction is on the one hand a polyaddition, and on the other a polyquaternization. The adducts manufactured in this way have a reduced tendency to take on a static charge and can be used with advantage in the textile and paper sectors.

18 Claims, No Drawings

PROCESS FOR THE MANUFACTURE OF POLYETHERS CONTAINING IONIC BONDS

Dialkylaminomethylphenols are easily obtainable by a Mannich reaction from phenols which possess at least one unsubstituted o- or p-position, formaldehyde and dialkylamines. Their use as curing agents and as curing accelerators for epoxide resins forms part of the state of the art and is disclosed in numerous publications. Their action as curing agents is based not only on the addition of phenolic hydroxyl to the epoxide group but, above all, on their ability, as tertiary amines, to initiate the cationic polymerization of epoxide groups. The Mannich bases of phenols are also employed as accelerators of the curing reaction of epoxide resins with acid anhydrides, with polycarboxylic acids and with acid amides, for which purposes only small catalytic amounts are employed. In both types of this curing reaction of epoxide resins, macromolecular crosslinked structures are produced, built up exlusively of homopolar bonds.

There are, moreover, already a number of known processes for the manufacture of polyquaternary products. In this connection attention is drawn to British Pat. No. 650.830 and German Auslegeschrift 1.495.693.

It is the task of the invention to provide cross-linked high polymers which contain ionic bonds and display pronounced electrical properties.

The task of the invention has been solved by subjecting Mannich bases, which are obtained by Mannich reaction of phenols, which contain at least one unsubstituted o- or p-position, with formaldehyde and dialkylamines, (A) on the one hand to a polyaddition with compounds containing an average of more than one 1,2-epoxide group and (B) to a polyquaternization with organic compounds containing at least 2 halogen atoms. The epoxide compound employed can optionally be partially polymerized cationically, in which case the polyether blocks thus produced are preferably incorporated into the macromolecule.

The Mannich bases employed as starting materials are mostly dialkylaminomethylphenols.

The subject of the present invention is a process for the manufacture of crosslinked macromolecular polyethers containing ionic bonds which is characterized in that polyhydric mononuclear or polynuclear phenols which contain as substituents, in the o- or p-positions to the OH groups, a total of at least 2 radicals of the formula I

in which $R^1$ and $R^2$ are identical or different and denote a saturated or unsaturated hydrocarbon radical with 1 to 4 carbon atoms or together denote the morpholino radical (Mannich bases) are subjected, optionally in the presence of water or organic solvents, at temperatures of 20° to 200°C A. on the one hand, to a polyaddition, in a manner which is in itself known, with compounds containing an average of more than one epoxide group, the epoxide groups reacting with the phenol groups, and B. on the other hand, to a polyquaternization, in a manner which is in itself known, with organic compounds containing at least 2 chlorine, bromine or iodine atoms.

By a "polyquaternization" (B) there is to be understood, according to the invention, a quaternization polyaddition in which the carbonium ions resulting from the organic compounds containing at least 2 halogen atoms, and the tertiary amino groups of the phenols containing at least 2 radicals of the formula I, are combined.

In general, the procedure followed according to the invention is to react the polyhydric, mononuclear or polynuclear, phenols, which contain at least 2 radicals of the formula I, with the compounds containing more than one epoxide group and the organic compounds containing at least 2 halogen atoms, in a ratio such that the reaction mixture contains 0.5 to 2 epoxide groups per phenolic OH group and 0.5 to 1.2 halogen atoms per tertiary amino groups of the formula I. In a preferred embodiment of the invention, the phenolic hydroxyl and epoxide, on the one hand, and tertiary amine and halogen, on the other hand, are present in the equivalent ratio.

According to the invention, the following two reaction sequences of the individual reactions are possible: either the reaction is carried out in two stages, that is to say the polyaddition (A) is first allowed to take place completely and the polyquaternization (B) is then carried out, or it is carried out in one stage, that is to say all the reactants are mixed simultaneously and the reactions are allowed to take place.

In the 2-stage synthesis, the Mannich base is preferably reacted with the epoxide resin to give a higher-molecular, but still fusible and soluble, pre-adduct. This can then be ionically crosslinked with the dihalogen compound or polyhalogen compound, either in bulk, in solution or in aqueous dispersion. This is shown in the formulae which follow for the case of the Mannich base of bisphenol A and 1,6-dichlorohexane:

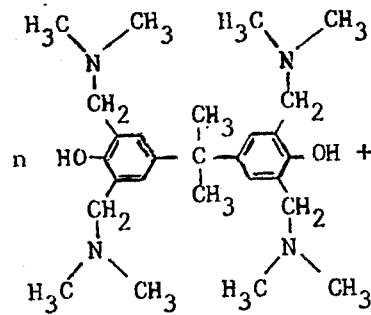
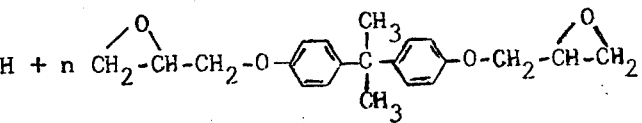

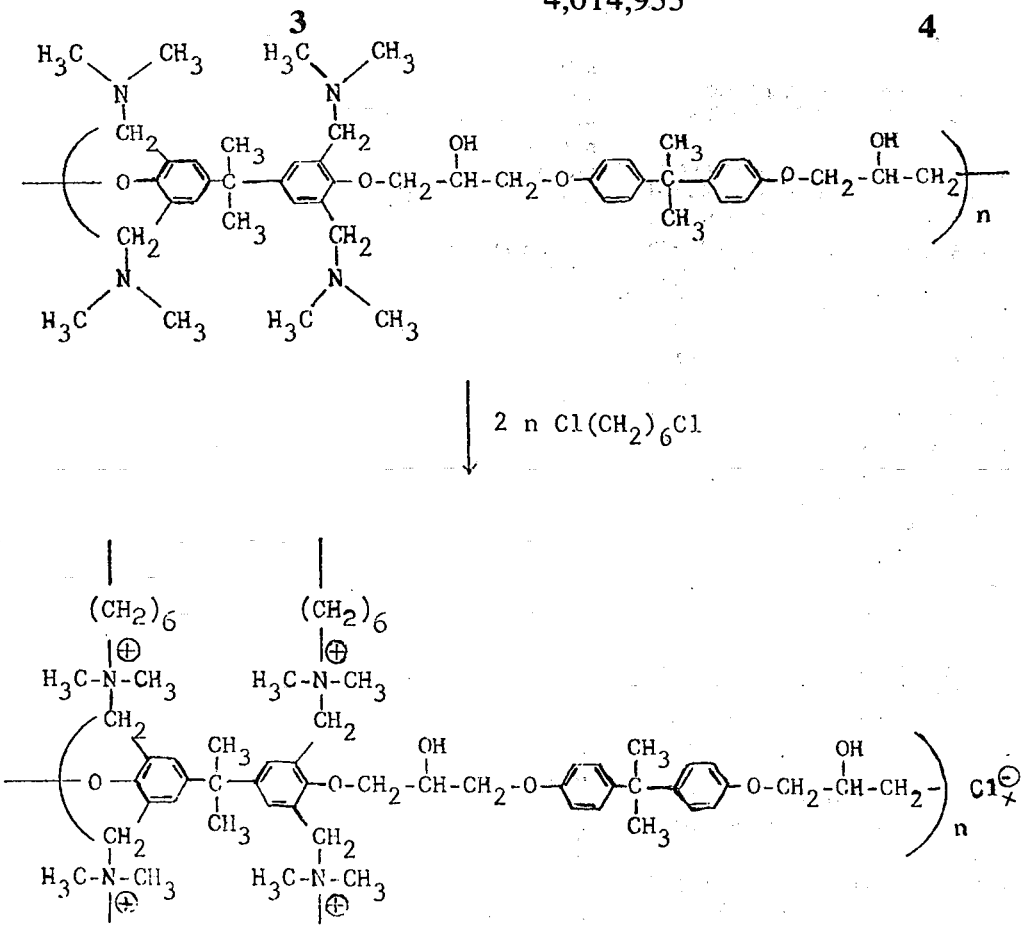

$$\downarrow 2\text{ n Cl}(CH_2)_6Cl$$

The facts that in these reactions
a. a solid which is infusible and insoluble but frequently able to swell considerably in water, is formed, and
b. the halogen employed in the form of halogenoalkane can be quantitatively titrated argentometrically in the water extract of the plastic can be regarded as proof of this reaction mechanism.

When the reaction is carried out in one step, both reactions take place alongside one another. The observations suggest that the amine-catalysed hydroxyl-epoxide polyaddition is the more rapid. Its heat of reaction is added to that of the ionic crosslinking. In the case of a reactive halogen compound, for example of the allyl or benzyl type, this second amount of heat liberated is also considerable. Particularly when working in the absence of solvents or diluents, precautions have to be taken to remove the heat in order to avoid internal overheating of the mouldings.

Depending on the end use envisaged, the reaction is allowed to take place in bulk, in solution or in aqueous dispersion. If the crosslinking is to be accompanied by macroscopic moulding, solvents or diluents should in general be excluded. In dilute solutions, gels or precipitates of highly disperse ionomers are obtained in some cases, and these give voluminous powders of large specific surface area after filtration and drying. The specific surface area is in general more than 5 m²/g.

In aqueous media, the reaction can be allowed to take place in the manner of a bead polymerization. For this purpose, protective colloids such as, for example, polyvinyl alcohol, methylcellulose, ethylcellulose, hydroxyethylcellulose or carboxymethylcellulose are frequently of value. The cross-linked addition polymer is obtained in the form of porous beads which are heavily swollen with water. If the product is used as an ion exchanger, this nature of the product is of particular value.

The manufacture (according to known processes) of the Mannich bases used as starting products for the process according to the invention preferably starts from dihydric phenols such as, for example, resorcinol, hydroquinone and bisphenol A. Particularly suitable Mannich bases are binuclear phenols of the formula II

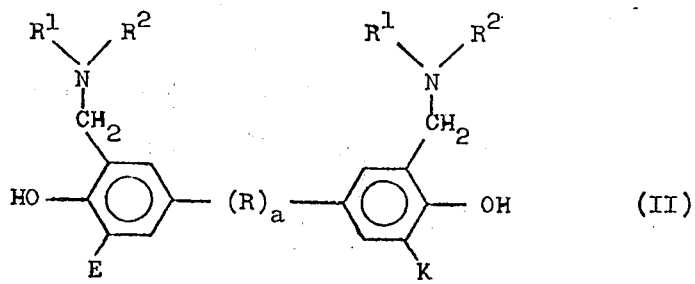

wherein E and K are the same or different and represent either hydrogen or the radical of the formula I, in which a is 0 or 1, and in which R represents one of the divalent radicals

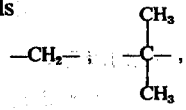

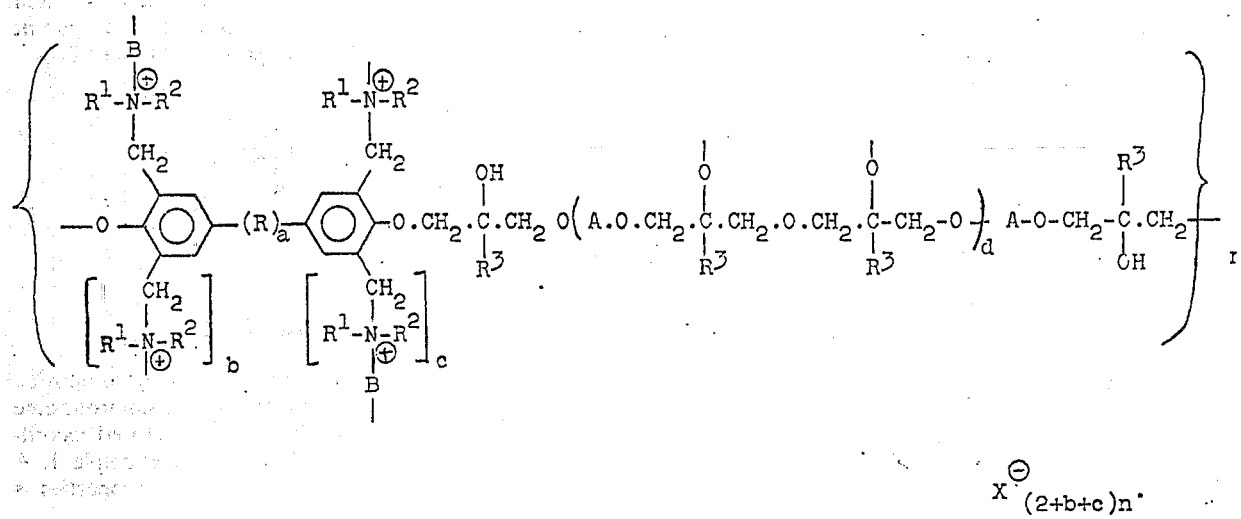

—SO—, $SO_2$— or —CO—. Examples of such phenols of the formula II are 2,2',6,6'-tetrakis(dimethylaminomethyl)bisphenol A, 2,2'-bis-(dimethylamino) 4,4'-dihydroxydiphenyl and 2,2',6-tris-morpholinomethyl-dihydroxydiphenylsulphone.

By compounds possessing an average of more than one epoxide group there are inter alia to be understood, according to the invention, epoxidized cycloolefines, the glycidyl esters of optionally hydrogenated phthalic acids, and heterocyclic glycidyl compounds such as glycidylhydantoins, glycidyluracils and triglycidylisocyanurate. In practice, all technical resins, offered, for example, by CIBA-GEIGY AG under the trade name ARALDIT, can be employed for the process according to the invention. The diglycidyl ethers which are derived from bisphenol A, and diglycidyl ethers of 1,4-butanediol, as well as tetraglycidyl ethers of pentaerythritol, are particularly suitable.

By organic compounds containing at least 2 chlorine, bromine or iodine atoms there are to be understood those low molecular or high molecular compounds which contain an average of more than one chlorine, bromine or iodine atom in the molecule. Fluorine compounds are generally insufficiently reactive towards Mannich bases and therefore do not fall within the scope of the present invention.

Examples of operative halogen compounds are: 1,2-dichloroethane, 1,2-dibromoethane, 1,2-diiodoethane, 1,3-chlorobromopropane, 1,4-dichlorobutane, 1,4-dibromobutane, 1,4-dichlorobutene-2, 1,6-dichlorohexane, 1,6-dibromohexane, 1,8-dibromooctane, 1,12-dichlorododecane, o-, m- and p-xylylene chloride, cyanuric chloride, 2,2'-dichlorodiethyl ether, polyepichlorohydrin and polyaddition products, containing chlorine, of polyhydric alcohols and epichlorohydrin.

A further subject of the invention are the crosslinked macromolecular polyethers which can be manufactured by the process according to the invention and contain ionic bonds. The polyethers according to the invention essentially have a network structure of the general formula III. The mobile halogen ions are contained in the cationic matrix.

In the formula III:
R denotes a divalent radical, for example —$CH_2$—,

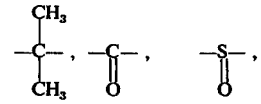

—$SO_2$— and the like, $R^1$ and $R^2$ denote saturated or unsaturated hydrocarbon radicals $C_1$ — $C_4$ or together denote —$CH_2.Ch_2.O.CH_2.CH_2$—, and can be identical or different, $R^3$ denotes H or $CH_3$, A denotes an organic, preferably divalent, radical of molecular weight 2,000 introduced through the polyglycidyl compound, B denotes an alkylene, alkenylene or aralkylene radical or a divalent polyether chain, X denotes Cl, Br or I, a, b and c are identical or different and denote 0 or 1, and d = 0 if the phenolic hydroxyl is in excess over epoxide, 0.5 in the case of equivalence, or >0   5 in the case of a stoichiometric excess of epoxide.

Depending on the valency of the radical A it is possible, as a deviation from the formula III, that the product manufactured according to the process of the invention also contains further branch points of the polyether chains.

The crosslinked polyethers according to the invention are mechanically stable and at the same time swellable in water. The catiomeric network and the mobile anions render the product suitable as ion exchangers. The ion exchange capacity is between 2 and 10 me/g.

Because of their ionic charges the polyethers according to the invention are suitable for use, for example, as plastics with reduced tendency to acquire a static charge, as antistatic textile finishes, as auxiliaries for the paper industry and as auxiliaries for effluent purification.

In the latter case, those polyethers which precipitate from dilute solutions are in particular suitable. Here, the large specific surface area has an advantageous effect additionally to the ionic charge.

The pattern of properties, described above, of the crosslinked polyethers which can be manufactured according to the process of the invention, which differs completely from that of epoxide resins which have been cured according to the known process, was not directly foreseeable.

The examples which follow are intended further to illustrate the invention. In these examples "parts" are to be understood as parts by weight. The relationship of parts by weight and parts by volume is as of the kilogram to the litre.

EXAMPLE 1 a. Manufacture of 2,2',6,6'-tetrakis(dimethylaminomethyl)-bisphenol A 912 parts of bisphenol A and 1,980 parts of 40% strength aqueous dimethylamine solution are vigorously stirred together. 1,330 parts of 37% strength aqueous formaldehyde solution are added dropwise to this suspension. The temperature is allowed to rise to 50°C and is kept thereat by means of external cooling. The bisphenol gradually dissolves and the mixture then turns cloudy, after which an oily phase separates out.

After dropwise addition of the formaldehyde solution, the temperature is raised to 80°C and kept thereat overnight, whilst stirring. All volatile components are then distilled off in a rotary evaporator at 150°C and 15 mm Hg. A viscous resin remains, which on standing slowly crystallizes after a prolonged period.

Yield: 1,730 parts, corresponding to 94.8% of theory.

|                  | Calculated for $C_{27}H_{44}N_4O_2$ | Found |
|------------------|-------------------------------------|-------|
| % C              | 71.05                               | 71.20 |
| % H              | 9.72                                | 9.80  |
| % N              | 12.28                               | 12.28 |
| Molecular weight | 456                                 | 453   |

A sample precipitated from n-heptane melts between 85° and 85.5°C.

b. Manufacture of a crosslinked ionomer 56.8 parts of a tetraglycidyl ether of pentaerythritol, the manufacture of which is described in Example 1 of French Pat. No. 2,025,496, and 62 parts of 1,6-dichlorohexane are mixed homogeneously and warmed to 60°C. 91.2 parts of the Mannich base, the manufacture of which is described above, are added and the whole is rapidly mixed at 60°C, degassed and poured into a mould of size 150×150×4 mm³. To remove the heat of reaction, the mould is placed in a water bath at 60°C. After the reaction mixture has gelled, it is warmed to 100°C for 2 hours in a heating cabinet and cured for 12 hours at 140°C. A light brown, transparent, tough and hard sheet is obtained, from which test bars are cut. The following properties are determined on these:

| Flexural strength (VSM 77,103) | 14.4 kg/cm² |
| Impact strength (VSM 77,105)   | 17.0 kg/cm  |
| Shore hardness D (ISO R 868)   | 69.7        |
| Heat distortion point (ISO R 75) | 92°C      |

Titration with silver nitrate solution shows that the water extract of a powdered sample of the ionomer contains 14.20% of chloride ions (calculated: 14.28%).

EXAMPLE 2

45.8 parts of diglycidyl ether of 1,4-butanediol having an epoxide equivalent weight of 115, 62 parts of 1,6-dichlorohexane and 91.2 parts of Mannich base, manufactured according to 1a), are reacted as described in Example 1. A flawless, transparent sheet having the following properties is obtained:

| % Cl⁻             | 11.6% (calculated 13.52%) |
| Flexural strength | 12.7 kg/mm²               |
| Impact strength   | 22.4 kg/cm                |
| Shore hardness D  | 73.3                      |
| Heat distortion point | 96°C                  |

EXAMPLE 3

77.8 parts of diglycidyl ether of bisphenol A, epoxide equivalent weight 194.5, 62 parts of dichlorohexane and 91.2 parts of Mannich base (manufactured according to 1a) are reacted as described in Example 1. A flawless test sheet having the following properties is obtained:

| % Cl⁻ | 12.15 (calculated: 12.38) |
| Flexural strength | 12.3 kg/mm² |
| Impact strength | 10.6 kg/cm |
| Shore hardness D | 99.0 |
| Heat distortion point | 138°C |
| Surface resistance (DIN 53,482) | $4.7 \times 10^7$ cm |
| Specific resistance according to DIN 53,482 | |

| Ω.cm | at °C |
|------|-------|
| $1.6 \times 10^9$ | 23 |
| $1.5 \times 10^9$ | 40 |
| $1.2 \times 10^9$ | 60 |
| $7.4 \times 10^8$ | 80 |
| $6.2 \times 10^7$ | 100 |
| $4.2 \times 10^6$ | 120 |
| $2.0 \times 10^5$ | 165 |
| $6.2 \times 10^4$ | 200 |

Within the investigated range of 10°–100°C, the specific resistance is independent of the test voltage. This finding, and the decrease in resistance with temperature, indicate an ionic mechanism of conduction of the current.

EXAMPLE 4

40 parts of polyepichlorohydrin containing 31.15% of chlorine and having a hydroxyl equivalent weight of 248 (a product of Dow Chem. Comp.), 33 parts of diglycidyl ether of bisphenol A and 40 parts of Mannich base according to 1a are poured into moulds, and cured, under the conditions of

EXAMPLES 1–3.

| Flexural strength | 5.94 kg/mm² |
| Impact strength   | 2.13 kg/cm  |
| Heat distortion point | 115°C   |

EXAMPLE 5 a. Manufacture of a polyadduct from the Mannich base of bisphenol A and the diglycidyl ether of bisphenol A 228 parts of Mannich base (manufactured according to Example 1a) are dissolved in 1,267.5 parts of technical xylene and heated to the boil. A solution of 194.5 parts of diglycidyl ether of bisphenol A (= equivalent) in 422.5 parts of xylene is added dropwise, whilst stirring. The mixture is boiled overnight under a reflux condenser and next morning the solvent is stripped off in vacuo on a rotary evaporator.

425 parts of a solid resin having the following properties remain

| | |
|---|---|
| Softening point | 71°C |
| Mean molecular weight | 845 |
| N-equivalent weight | 228 | b. Manufacture of a highly dispersed ionomer 91 parts of the polyadduct described under 5a are dissolved in 464 parts of xylene and the solution is warmed to 70°C. 25 parts of 1,4-dichlorobutene-2 are added dropwise to this solution, whilst stirring. The temperature of the reaction mixture rises and a precipitate forms. The mixture is boiled for 5 hours whilst stirring and is cooled to 25°C, and the precipitate is filtered off, washed with petroleum ether abd dried at 100°C and 15 mm Hg.

114 parts (98% of theory) of an infusible, insoluble, yellow-brown powder having a specific surface area of 119 m²/g are obtained.

| Analysis | % N | 4.51 |
|---|---|---|
| | % Cl⁻ | 10.7 |

The degree of quaternization CL⁻/N is 93.7%.

EXAMPLE 6

Manufacture of an anion exchange resin 99 parts of Mannich base of bisphenol A (manufactured according to 1a) and 1,114 parts of deionised water in which 1.3 parts of polyvinyl alcohol are dissolved are warmed to 75°C whilst stirring. 67 parts of 1,4-butanediol diglycidyl ether (vid. Example 2), followed by 59.5 parts of 1,4 dichlorobutene-2, are added dropwise and the mixture is stirred overnight at 75°C. The speed of stirring is adjusted so that the oily phase is broken up into 1–2 mm droplets.

After cooling, the reaction mixture has a pH value of 4.5. The droplets have solidified to porous infusible beads of approx. 1 mm diameter. They are filtered off and continuously washed with cold water until no chloride ions are detactable with silver nitrate.

The exchange capacity of this anionomer is 2.7 milliequivalents/g of dry substance.

EXAMPLE 7

57 parts of bisphenol A, 112,5 parts of aqueous 40% strength dimethylamine solution and 100 parts of formaldehyde are reacted for 3 hours at 40°C to give the Mannich base. 340 parts of water, in which 1.3 parts of polyvinyl alcohol are dissolved, are added. The mixture is heated to 90°C and the speed of stirring is increased. 95 parts of diglycidyl ether of bsphenol A and 129.2 parts of 1,8-dibromooctane are added. The speed of stirring is adjusted so that the oil phase is broken up into approximately mm-sized droplets and stirring is continued overnight at 90°C.

After cooling, 923 parts of moist infusible bead condensate are obtained, having a solids content of 12.4% and an exchange capacity of 1.86 milliequivalents per gram.

EXAMPLE 8 a. Manufacture of a Mannich base of the formula III

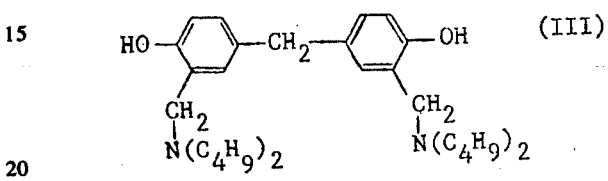

100 parts of 4,4'-dihydroxydiphenylmethane, 85.1 parts of aqueous 37% formaldehyde solution, and 129 parts of dibutylamine are reacted as described in Example 1a.

After hydroextraction of 17 Torr and 150°C, there are obtained 233 parts of a brown liquid resin with a viscosity of 26'800 cP at 25°C.

| Yield | 96,7 % of theory | |
|---|---|---|
| Analysis | calc. on C₃₁H₄₈N₂O₂ | found |
| % C | 77,13 | 77,32 |
| % H | 10,44 | 10,34 |
| % N | 5,80 | 5,55 |
| MG | 482,73 | 506 | b. Manufacture of an ionomer

The following 3 products are processed according to the method of Example 1b:

| | |
|---|---|
| Mannich base of the formula III | 48.2 parts |
| 1,6-dibromohexane | 24.3 parts |
| tetraglycidyl ether of pentaerythritol (french patent 2.025.496) | 27.5 parts |
| Form: 150 × 150 × 4 mm³ | |
| Curing: 2 hours at 100°C, 12 hours at 140°C. | |

| Result | |
|---|---|
| Flexural strength | 5.3 kg/mm² |
| Impact strength | 5.8 kg/cm |
| Shore hardness D | 61 |
| Dimensional stability under heat | 53°C |

EXAMPLE 9

The following three substance are processed according to Example 1b:

| | |
|---|---|
| Mannich base of the formula III | 48.3 parts |
| cyanuric chloride | 12.2 parts |
| diomethane epoxide resin (epoxide content: app- 5 eq./kg) | 39.6 parts |
| Form: 150 × 150 × 4 mm³ | |
| Curing: 2 hours at 100°C. 12 hours at 140°C. | |

| Result | |
|---|---|
| Flexural strength | 4.8 kg/mm² |
| Impact strength | 1.6 kg/cm |
| Shore hardness D | 62 |
| Martens (dimensional stability under heat) | 58°C |

EXAMPLE 10 a. Manufacture of a Mannich base of the formula IV

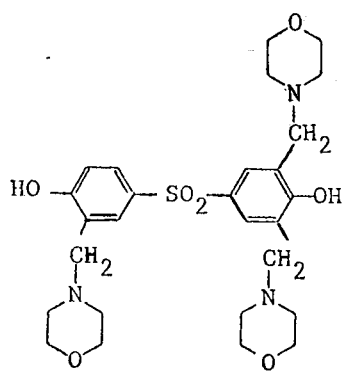

125 parts of 4,4'-dihydroxydiphenylsulphone, 127.6 parts of aqueous 37% formaldehyde solution, and 130.5 parts of morpholine are reacted as described in Example 1a to give 233 parts of a brown solid resin.

| Yield | 85,3 % of theory | |
|---|---|---|
| Analysis | calc. on $C_{27}H_{37}O_7N_3S$ | found |
| % C | 59,21 | 59,07 |
| % H | 6,80 | 7,08 |
| % N | 7,67 | 8,06 |
| % S | 5,85 | 5,31 |
| MG | 547,67 | 555 | b. Manufacture of a cross-linked ionomer

The following three products are processed according to the method of Example 1b:

| | |
|---|---|
| Mannich base of the formula IV | 48 parts |
| dibromohexane | 32 parts |
| butane diol diglycidyl ether (vid. Example 2) | 20 parts |

Form: 150 × 150 × 4 mm³
Curing: 2 hours at 100°C, 12 hours at 140°C.

| Result | |
|---|---|
| ionogenic bromine | 20.1% |
| degree of quaternization | 95% |
| flexural strength | 9.5 kg/mm² |
| impact strength | 3.1 kg/cm |
| Shore hardness D | 71 |
| dimensional stability under heat | 62°C. |

What we claim is:

1. A process for the manufacture of crosslinked macromolecular polyethers containing ionic bonds, wherein polyhydric mononuclear or polynuclear phenols which contain as substituents, in the o- or p-positions to the OH groups, at least 2 radicals of the formula I

in which $R^1$ and $R^2$ are identical or different and denote a saturated or unsaturated hydrocarbon radical with 1 to 4 carbon atoms or together denote the morpholino radical (Mannich bases) are subjected, optionally in the presence of water or organic solvents, at temperatures of 20° to 200°C A. on the one hand, to a polyaddition, in a manner which is in itself known, with compounds containing an average of more than one 1,2-epoxide group, the epoxide groups reacting with the phenol groups, and B. on the other hand, to a polyquaternization, in a manner which is in itself known, with organic compounds containing at least 2 chlorine, bromine or iodine atoms.

2. A process according to claim 1, wherein the polyhydric phenols are reacted with the compounds containing more than one epoxide group and the organic compounds containing at least 2 halogen atoms in a ratio such that the reaction mixture contains 0.5 to 2 epoxide groups per phenolic OH group and 0.5 to 1.2 halogen atoms per tertiary amino groups of the formula I.

3. A process according to claim 1, wherein a start is made from a reaction mixture, which, in addition to the polyhydric phenols (Mannich bases), also contains compounds containing epoxide groups according to A), and organic compounds containing halogen, according to B).

4. A process according to claim 1, wherein first the polyaddition A) and thereafter the polyquaternization B) are allowed to take place.

5. A process according to claim 1, wherein dihydric phenols are used as polyhydric mononuclear or polynuclear phenols which contain a total of at least 2 groups of the formula I as substituents.

6. A process according to claim 5, wherein compounds of the formula II

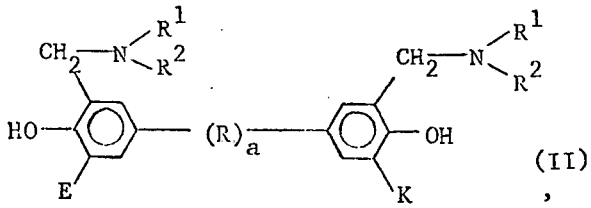

wherein E and K are the same or different and represent either hydrogen or the radical of the formula I, in which $a$ is 0 or 1, and in which R represents one of the divalent radicals

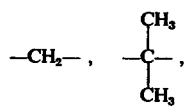

—SO—, SO₂— or —CO—, are used as dihydric mononuclear or polynuclear phenols.

7. A process according to claim 6, wherein there are used compounds of the formula II, in which R represents one of the radicals

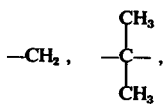

or —SO₂—.

8. A process according to claim 7, wherein 2,2',6,6'-tetrakis(dimethylaminomethyl)bisphenol A is used as the dihydric phenol of the formula II.

9. A process according to claim 1, wherein halogenoalkanes or halogenoalkenes containing at least 2 halogenatoms and 2 to 18, preferably 4 to 8, carbon atoms, are used as the organic compound containing at least 2 chlorine, bromine or iodine atoms.

10. A process according to claim 4, wherein halogenoalkanes or halogenoalkenes with terminal halogen atoms are used.

11. A process according to claim 1, wherein polyepihalogenohydrins with a degree of polymerisation of 3 to 500 are used as organic compounds containing at least 2 chlorine, bromine or iodine atoms.

12. A process according to claim 1, wherein polyaddition products of epihalogenohydrin and polyhydric alcohols are used as organic compounds containing at least 2 chlorine, bromine or iodine atoms.

13. A process according to claim 1, wherein carbocyclic or heterocyclic compounds in which the halogen atoms are bonded to the ring directly or via an alkylene group with 1 to 4 carbon atoms are used as organic compounds containing at least 2 chlorine, bromine or iodine atoms.

14. A process according to claim 13, wherein cyanuric chloride is used.

15. A process according to claim 1, wherein organic compounds containing at least 2 chlorine or bromine atoms are employed.

16. A process according to claim 1, wherein diglycidyl ethers of 4,4'-isopropylidenediphenol or 1,4-butandediol or tetraglycidyl ethers of pentaerythritol are used as the compound containing an average of more than one epoxide group.

17. Crosslinked macromolecular polyethers, containing ionic bonds, produced by the process of claim 1.

18. Polyethers according to claim 7, which have a specific surface area of at least 5 $m^2/g$.

* * * * *